United States Patent Office 2,853,525
Patented Sept. 23, 1958

2,853,525

PROCESS OF PRODUCING SODIUM TETRAPHENYLBORON

Georg Wittig, Tubingen, and Paul Raff, Ludwigshafen (Rhine), Germany

No Drawing. Application June 1, 1954
Serial No. 433,841

Claims priority, application Germany June 20, 1953

6 Claims. (Cl. 260—606.5) 

The present invention relates to a novel process of producing sodium tetraphenylboron, and more particularly to a simple method of producing sodium tetraphenylboron which may be used in the quantitative determination of potassium, rubidium, cesium and ammonium ions.

This application is a continuation-in-part of our copending application Serial No. 256,371, filed November 14, 1951, now abandoned, for "Complex Metal Aryls."

It has been shown by G. Wittig (Zeitschrift für angewandte Chemie, vol. 62, p. 231, (1950)) that the lithium compound of tetraphenylboron in aqueous solution yields a white finely crystalline precipitate of the corresponding complex salts even with very dilute solutions containing potassium, rubidium, cesium, or ammonium ions, which precipitates are still more difficultly soluble than the corresponding perchlorates. The lithium compound of tetraphenylboron is, however, very expensive, and in practice only rendered available with very great difficulty.

Although lithium tetraphenylboron will react with potassium ions for example to precipitate an insoluble potassium tetraphenylboron, there is apparently no reaction between lithium tetraphenylboron and sodium ions so that it is not possible to produce sodium tetraphenylboron by such reaction.

It has been found that sodium tetraphenylboron possesses the same properties as lithium tetraphenylboron and that the sodium tetraphenylboron can be used for the quantitative determination of potassium, rubidium, cesium, or ammonium ions. However prior to the present invention there was no simple method of producing sodium tetraphenylboron economically and in good yield. In view of the much sought after improved methods of quantitative determination of potassium and the like ions, it may be seen that the economical production of sodium tetraphenylboron would be most desirable.

It is therefore a primary object of the present invention to provide a novel and simple method of producing sodium tetraphenylboron in very high yield.

It is another object of the present invention to provide a process of producing substantially pure sodium tetraphenylboron which can be directly used for the quantitative determination of ions such as potassium and the like.

Other objects and advantages of the present invention will be apparent from a further reading of the specification and of the appended claims.

With the above objects in view, the present invention mainly comprises a process of producing sodium tetraphenylboron, comprising the steps of reacting a phenyl magnesium halogenide with a boron trihalogenide so as to form a reaction mass including boron tetraphenyl magnesium halogenide, and treating the boron tetraphenyl magnesium halogenide with sodium ions so as to form sodium tetraphenylboron.

The reaction may be accomplished preferably by refluxing the reactants in ether solution, as a normal Grignard reaction. It is a further preferred embodiment of the present invention to utilize the boron trihalogenide-etherate in ether solution and to react this with the phenyl magnesium halogenide to form the boron tetraphenyl magnesium halogenide.

The term "boron trihalogenide-etherate" is meant to denote the following molecular combination:

$$BX_3 \cdot (C_2H_5)_2O$$

wherein X is a halogen atom such as fluorine or chlorine. The so-called etherate is formed when the gaseous boron trihalogenide, e. g. boron trifluoride, is introduced into ether. The etherate is preferred because of its solubility in ether and further because it has a constant boiling point and can therefore be obtained by distillation from an ether solution.

The etherate, which is liquid at normal temperatures, either alone or diluted with ether is more practical for use in the process of the present invention than the normally gaseous boron trifluoride since it is easier to control the exact amount used when working with a liquid than with a gas and it is preferred according to the process of the present invention to utilize the boron trihalogenide in an amount up to the equivalence point and an excess of boron trihalogenide should be avoided.

Of course it is also possible to utilize the gaseous boron trihalogenide, e. g. boron trichloride, in the ethereal Grignard solution in an amount up to the equivalence point, which may be determined by simple pretesting. The above discussion applies as well as to the boron trifluoride and boron tribromide.

The reaction of the phenyl magnesium halogenide with the boron trihalogenide results in the formation of boron tetraphenyl magnesium halogenide and magnesium halogenide. In order to recover sodium tetraphenyl boron from the formed reaction mass, the reaction mass is dissolved in water while stirring, after removal of the ether if the reaction is carried out in ether solution and/or utilizing boron trihalogenide-etherate. The dissolution of the reaction mass in the water results in heating of the water almost to boiling. The solution is then treated with sodium ions, e. g. in the form of a water-soluble inorganic sodium salt such as sodium chloride. Preferably an amount of the sodium salt is utilized which is sufficient to form the sodium tetraphenylboron and to salt-out the formed sodium tetraphenylboron from the solution. Saturating the aqueous solution with the inorganic sodium salt, e. g. sodium chloride, will accomplish this result. The resulting precipitate of sodium tetraphenylboron may then be filtered, washed, dried and milled to a dust-free product. This product may further be purified by extraction with a dry organic solvent such as acetone.

Although sodium chloride is the most preferred inorganic sodium salt for the purposes of converting the boron tetraphenyl magnesium halogenide to sodium tetraphenylboron, for reasons of economy and ease of handling, it is to be understood that other sources of sodium ions in aqueous solution e. g. other sodium salts such as sodium sulfate, sodium bromide, and the like may be used with equally good results.

The following equations illustrate the reaction mechanism of the process of the present invention:

(1) $4C_6H_5MgX + BX_3 = (C_6H_5)_3B \cdot C_6H_5MgX + 3MgX_2$
(2) 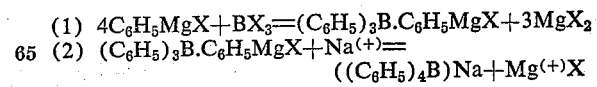

X of course stands for the halogen atoms. Preferably, the phenyl magnesium halogenide is phenyl magnesium bromide, and the boron trihalogenide is either $BF_3$, $BCl_3$, or $BBr_3$. It may be seen from the above equations that the reaction should preferably be carried out utilizing an exact ratio of 4 mols of phenyl magnesium halogenide per each mol of boron trihalogenide.

The following examples are given as illustrative of the process of the present invention, the scope of the invention not however being limited to the specific details of the examples.

Example 1

A solution of 8.5 g of boron trifluoride-etherate in 25 cc. of absolute ether is added dropwise, while stirring and refluxing, to an ethereal solution of phenylmagnesium bromide prepared from 6.4 g. of magnesium in 100 cc. of absolute ether and 40 g. of bromobenzene, up to the point of equivalence. An excess of boron trifluoride should be avoided. The ether is thereupon completely removed. The remaining viscous reaction residue is dissolved in 250 cc. of water while stirring, during which process the water is heated up to nearly its boiling point. After cooling, the solution is freed of insolubles, and the clear solution is saturated with common salt. A thick white precipitate is formed during this process which, after filtration, is washed, dried, and milled to a dust-free product. The raw product is purified by extraction with, for example, dry acetone. The stone-hard cake remaining after removal of the acetone is pulverized and dried under a high vacuum at 100° C. The resulting product is substantially pure sodium tetraphenylboron.

Example 2

The process of Example 1 is repeated exactly utilizing however 4 g. of boron trifluoride dissolved in 30 cc. of absolute ether instead of the 8.5 g. of boron trifluoride-etherate dissolved in 25 cc. of ether. The resulting product is the same as in Example 1.

Example 3

To an ether solution of phenyl magnesium bromide produced from 6.4 g. of magnesium in 100 cc. of absolute ether and 40 g. of bromobenzol is added dropwise while stirring and refluxing a solution of 11.5 g. of boron trichloride-etherate in 30 cc. of absolute ether until the equivalence point is reached. An excess of boron trichloride should be avoided. The ether is removed and the remaining thickly viscous reaction residue is dissolved in 250 cc. of water by stirring whereby the water is heated to practically the boiling point. After cooling, the undissolved portion is removed and the cooled solution is saturated with sodium chloride. This results in the precipitation of a thick white precipitate which after filtration is washed, dried and milled to a dust-free product. The product is further purified by extraction with dry acetone. After removal of the acetone a hard cake is obtained which is pulverized and dried under high vacuum at 100° C. The yield is 13 g. of sodium tetraphenylboron.

Example 4

Example 3 is repeated exactly utilizing however 7 g. of boron trichloride in 35 cc. of absolute ether instead of the boron trichloride-etherate. The resulting product is the same and the yield is also substantially the same.

Example 5

Example 3 is repeated utilizing however 19 g. of boron tribromide-etherate dissolved in 30 cc. of absolute ether. The resulting product is the same and the details of the process are the same as described in Example 3.

Example 6

Example 5 is repeated utilizing however 15 g. of boron tribromide dissolved in 35 cc. of absolute ether instead of the boron tribromide-etherate of Example 5. All other details of the process are the same as is the product and the yield.

While the invention has been illustrated and described as embodied in a process of producing sodium tetraphenylboron, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A process of producing sodium tetraphenylboron, comprising the steps of reacting phenyl magnesium bromide with a boron trihalogenide in the ratio of 4 mols of phenyl magnesium bromide per each mol of boron trihalogenide under normal Grignard reaction conditions so as to form a reaction mass including boron tetraphenyl magnesium halogenide; and treating said boron tetraphenyl magnesium halogenide in aqueous solution with a water soluble inorganic sodium salt so as to form sodium tetraphenylboron.

2. A process of producing sodium tetraphenylboron, comprising the steps of refluxing phenyl magnesium bromide with a boron trihalogenide in the ratio of 4 mols of phenyl magnesium bromide per each mol of boron trihalogenide in ether solution under normal Grignard reaction conditions so as to form a reaction mass including boron tetraphenyl magnesium halogenide; dissolving said boron tetraphenyl magnesium halogenide in water so as to form an aqueous solution thereof; and treating said aqueous solution with a water soluble inorganic sodium salt, thereby forming sodium tetraphenylboron.

3. A process of producing sodium tetraphenylboron, comprising the steps of refluxing phenyl magnesium bromide with a boron trihalogenide-etherate in the ratio of 4 mols of phenyl magnesium bromide per each mol of boron trihalogenide under normal Grignard reaction conditions so as to form a reaction mass including boron tetraphenyl magnesium halogenide; dissolving said boron tetraphenyl magnesium halogenide in water so as to form an aqueous solution thereof; and treating said aqueous solution with a water soluble inorganic sodium salt, thereby forming sodium tetraphenylboron.

4. A process of producing sodium tetraphenylboron, comprising the steps of reacting a phenyl magnesium halogenide with a boron trihalogenide selected from the group consisting of boron trifluoride, boron trichloride and boron tribromide in the ratio of 4 mols of phenyl magnesium halogenide per each mol of boron trihalogenide under normal Grignard reaction conditions so as to form a reaction mass including boron tetraphenyl magnesium halogenide; and treating said boron tetraphenyl magnesium halogenide in aqueous solution with a water soluble inorganic sodium salt so as to form sodium tetraphenylboron.

5. A process of producing sodium tetraphenylboron, comprising the steps of refluxing an ether solution of phenyl magnesium bromide and a boron trihalogenide in the ratio of 4 mols of phenyl magnesium bromide per each mol of boron trihalogenide under normal Grignard reaction conditions so as to form a reaction mass including boron tetraphenyl magnesium halogenide; evaporating the ether; dissolving the thus formed residue in water so as to form an aqueous solution including boron tetraphenyl magnesium halogenide in solution; treating said aqueous solution with an amount of sodium chloride sufficient to form sodium tetraphenylboron and to salt-out the thus formed sodium tetraphenylboron, thereby obtaining a precipitate of said sodium tetraphenylboron; and recovering substantially pure sodium tetraphenylboron.

6. A process of producing sodium tetraphenylboron, comprising the steps of adding dropwise to a solution of phenyl magnesium bromide prepared from 6.4 g. magnesium, 40 g. of bromobenzene and 100 cc. of absolute ether while stirring and refluxing a solution of 8.5 g. of a solution of boron trifluoride-etherate in 25 cc. of absolute ether so as to form a reaction mass; evaporating the ether from the thus formed reaction mass; dissolving the thus remaining reaction mass in 250 cc. of water, whereby the water is heated almost to boiling; cooling the thus formed solution; removing insolubles from said solution; saturating said solution with sodium chloride, thereby precipitating sodium tetraphenylboron; filtering; washing the thus filtered precipitate; drying the thus washed precipitate; and milling said precipitate to finely divided form.

References Cited in the file of this patent

Wittig: Zeit. Angewandte Chemie, 62, pages 231–33 (1950).

Karrer: Organic Chemistry, fourth English edition (1950), page 151.

Nitsche et al.: 55 Berichte 1262. (Copy available in Patent Office Scientific Library.)

Kharasch et al.: "Grignard Reactions of Nonmetallic Substances," Prentice-Hall, Inc., New York (1954), page 38. (Copy in Sci. Library.)